(12) United States Patent
Hecker (10) Patent No.: US 10,592,904 B2
(45) Date of Patent: Mar. 17, 2020

(54) CARD SHIMMER DETECTION

(71) Applicant: NCR Corporation, Duluth, GA (US)

(72) Inventor: Weston Lee Hecker, Bismarck, ND (US)

(73) Assignee: NCR Corporation, Atlanta, GA (US)

( * ) Notice: Subject to any disclaimer, the term of this patent is extended or adjusted under 35 U.S.C. 154(b) by 334 days.

(21) Appl. No.: 15/637,441

(22) Filed: Jun. 29, 2017

(65) Prior Publication Data
US 2019/0005503 A1 Jan. 3, 2019

(51) Int. Cl.
| | | |
|---|---|---|
| *G06Q 20/40* | (2012.01) | |
| *G06K 7/00* | (2006.01) | |
| *G06K 19/073* | (2006.01) | |
| *G06Q 20/34* | (2012.01) | |
| *G06Q 20/38* | (2012.01) | |
| *G07F 7/10* | (2006.01) | |
| *G08B 13/00* | (2006.01) | |

(52) U.S. Cl.
CPC ....... *G06Q 20/4016* (2013.01); *G06K 7/0013* (2013.01); *G06K 7/0091* (2013.01); *G06K 19/073* (2013.01); *G06Q 20/341* (2013.01); *G06Q 20/382* (2013.01); *G06Q 20/4097* (2013.01); *G07F 7/1016* (2013.01); *G08B 13/00* (2013.01)

(58) Field of Classification Search
CPC .. G06K 7/0008; G06K 7/0013; G06K 7/0091; G06K 19/073; H05K 5/0208; G06Q 20/341; G06Q 20/382; G06Q 20/4097; G07F 7/1016

USPC .......................................................... 235/492
See application file for complete search history.

(56) References Cited

U.S. PATENT DOCUMENTS

| | | | |
|---|---|---|---|
| 5,122,646 A | 6/1992 | Taeymans et al. | |
| 6,164,550 A | 12/2000 | Pitsch | |
| 7,293,709 B2 | 11/2007 | Baker et al. | |
| 7,721,963 B2 | 5/2010 | Schliebe | |
| 9,578,763 B1* | 2/2017 | Wade | H05K 5/0208 |
| 2011/0253788 A1* | 10/2011 | Campbell | G06K 7/0008 235/441 |
| 2018/0336756 A1* | 11/2018 | MacKinnon | G07F 19/2055 |

FOREIGN PATENT DOCUMENTS

| | | |
|---|---|---|
| DE | 196 53 412 A1 | 7/1998 |
| EP | 2 722 788 A1 | 4/2014 |
| WO | 96/00951 | 1/1996 |

OTHER PUBLICATIONS

EP Search Report—dated Nov. 21, 2018.

* cited by examiner

*Primary Examiner* — Daniel A Hess
(74) *Attorney, Agent, or Firm* — Schwegman, Lundberg & Woessner (57) ABSTRACT

A shim detection device is selectively interfaced to a portion of a chip card reader that is integrated into a terminal. The shim detection device is configured to detect when a shimmer is inserted into the chip card reader during a card transaction at the terminal and take an automated action in response thereto.

19 Claims, 6 Drawing Sheets

CARD SHIMMER DETECTION

BACKGROUND

The industry lacks any technique for detecting card "shimming." A shimmer device steal information off of card chips and Personal Identification Numbers (PIN) off of Euro pay Master® and Visa® (EMV) cards. Shimmers are beginning to become the device of choice for thieves in the industry as a variety of mechanisms exist to detect skimmers but none are available to detect shimmers. Skimmers read the magnetic strip of cards whereas shimmers steal data from predefined contact points on the cards (such as specific locations on the embedded chip of cards).

Banks have focused on skimmer detection and during that process have switched out consumer cards to cards having embedded chips believing cards with chips to be superior security to cards without embedded chips. Meanwhile, thieves have developed shimmers that steal card information off contact points of the embedded chips and, at present, the banks have failed to produce any reliable shimmer detection and prevention hardware and software security.

Thus, shimmers present significant challenges in the card industry and will continue to be problematic for the industry for the foreseeable future.

SUMMARY

In various embodiments, a methods and a system for shimmer detection and prevention are provided.

According to an embodiment, a system for shimmer detection and prevention are provided. The system including a chip card reader and a shim detection device. The shim detection device is interfaced to at least a portion of the chip card reader and configured to detect when a shimmer is inserted in the chip card reader during a card transaction at a terminal.

DETAILED DESCRIPTION

Figure 1A:
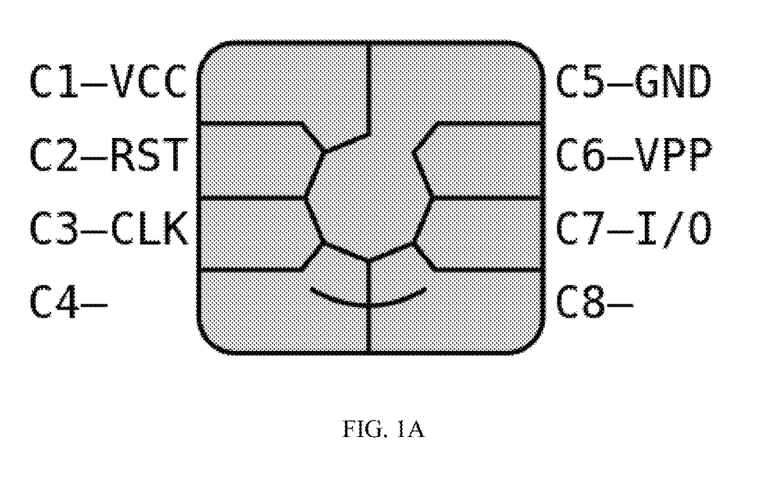
FIG. 1A is a diagram illustrating the contact points on a chip that is typically embedded in cards, according to an example embodiment.

FIG. 1A is a diagram illustrating the contact points on a chip that is typically embedded in cards, according to an example embodiment.

The segmented areas of the chip provide a variety of chip contact points with a card reader when a card with an embedded chip is inserted into the card reader. C1 (known as VCC) provides the chip power when the chip from the card makes contact inside the card reader. C2 provides contact within the reader for a reset signal. C3 provides contact within the reader for a clock signal. C4 is reserved as a contact point for future expansion. C5 provides a contact point within the reader for grounding. C6 provides a contact point within the reader for variable supply voltage (known as VPP). C7 provides a contact point within the reader for Input/Output (I/O) of information supplied to the card and supplied by the card while the card is inserted into the reader. C8 is reserved as a second contact point for future expansion and use as was C4.

A shimmer is a very small device that is inserted into the card reader to fit in such a way that overlay contacts are made between the chip on the card and the contact points within the card reader so as to steal information from the card provided on the chip of the card when the card is inserted into the reader.

When a shimmer is inserted into a card reader, there is a deviation in the normal or expected voltage (C1 contact point) and ground (C5 contact point) that deviates from what should occur when the shimmer is not present within the card reader.

Various methods, devices, and systems presented herein and below can automatically detect these deviations and perform a variety of customized actions, and thereby providing enhanced security for shim detection and prevention. At present, no known shimming detection technique or device is available in the industry.

Figure 1B:
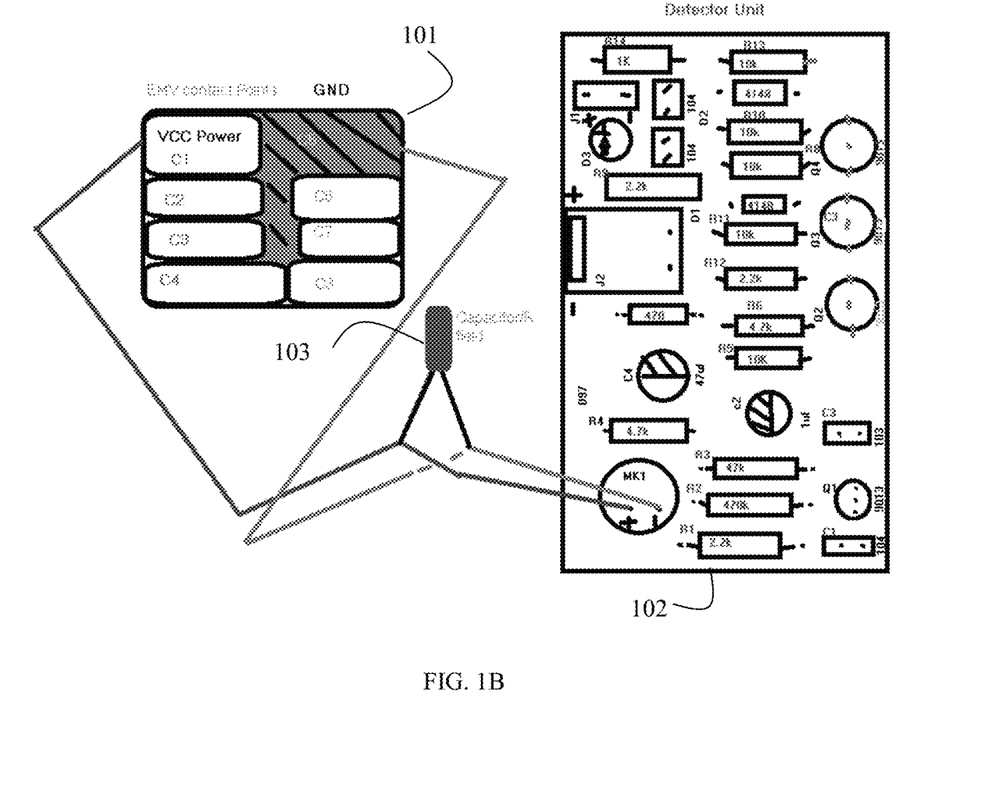
FIG. 1B is a diagram of a system for shimmer detection and prevention, according to an example embodiment.

FIG. 1B is a diagram of a system for shimmer detection and prevention, according to an example embodiment.

The system includes a chip from a card with an embedded chip 101 and a novel shim detection unit (device) 102.

A shim may include a variety of mechanisms to communicate stolen information from a card when it is inserted into the card reader and overlaid on the chip reader's chip contact points C1-C8. This can be done through low energy Blue Tooth® transmissions from the shimmer or short bursts of Radio Frequency (RF). A thief may stick another small relay device hidden from view near the terminal (Self-Service Terminal (SST), Automated Teller Machine (ATM), or Point-Of-Sale (POS) terminal) that has the integrated chip card reader for purposes of relaying the information to an external network connection (such as cellular, Wi-Fi, and the like).

The system includes a capacitor/resistor component 103 (labeled Capacitor/R field labeled in the FIG. 1B). The capacitor 103 includes two leads each attached or overlaid on the C1 (voltage) and C8 (ground) of the card readers chip contact points. The capacitor 103 is attached to an MK1 component of the device 102. MK1 provides input to the device 102 and detects sound deviation caused by field noise from heat caused in capacitor 103 representing voltage changes. Voltage varies over time from a rouge device (such as a shimmer device) that is stealing energy, which will cause the F-field to generate noise.

R1-R13 of the device 102 tracks "silence" to "loud" noise over time, such that the device 102 detects noise deviations in 4 filtered stages. R1-R3 is level 1 or stage 1; R5, R6, and R12 is level 2 or stage 2, R11, R8, and R10 are level 3 or stage 3; and R-13 is level 4 or stage 4. Heat emanating from the C1 and C5 contact points cause detection of heat, the stages of that heat are detected as different stages/levels of heat. Each stage is triggered by the stage before it being triggered, such that the stages are filtering different detected levels of noise.

Stage 1 is configured to filter out or detect a normal level of noise associated with a typical transaction being conducted at the terminal from the chip card reader. Stage 2 is configured to filter out or detect noise generated from the operating environment of the terminal (such as a hot day or weather conditions), stage 3 should not typically be triggered during a chip card reader transaction at the terminal.

Figure 1C:
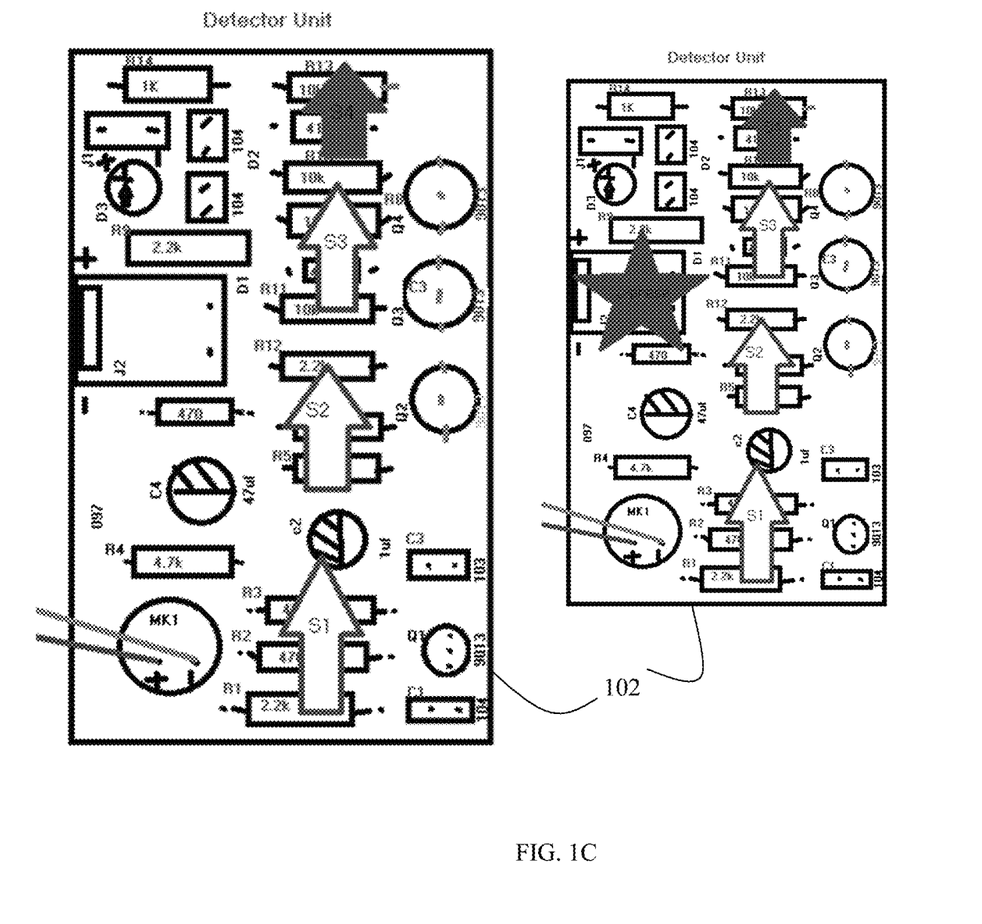
FIG. 1C is two diagrams illustrating a shimmer detection device, according to an example embodiment.

When all 5 gates illustrated in the device 102 are triggered, the device 102 automatically activates the J-phase (see FIG. 1C first depiction on the right of the device 102). Once the J-phase is triggered J2 becomes fully powered (see FIG. 1C second depiction on the left of the device 102).

The J2 is adapted to attach to a variety of devices including a microcontroller capable of interfacing to contact points within the terminal and shutting down the terminal. Thus, J2 once powered can provide a notification or an alert, such as a small buzzing sound (from an attached buzzer), a lighted Light Emitting Diode (LED), a Short Message Service (SMS) text message from a Subscriber Identity Card (SIM), and instructing the microcontroller of the terminal to power the terminal off. Thus, J2 can provide connectivity to any sensor, small device, and or microcontroller that takes a predefined action when it is powered on and the power is supplied automatically when the device 102 passes through all 5 gates and reaches stage 4 of noise filtering.

Any microcontroller connection can also support machine-to-machine (M2M) communications for more complex types of notifications. For example, predefined streams of information (such as Field 55) can be sent M2M for fraud detection and prevention on usage of the card. Such M2M can prevent future attempts to use the card and shut down the card through no human interaction or action. This can be used for two-way interaction. For example, if the card being read by the chip card reader was used across the country less than an hour before the card is now trying to be read by the chip card reader, the microcontroller can shut down the terminal upon identification of the card at the terminal.

The device 102 can be manufactured entirely as specialized hardware and without any software executing thereon. The size of the device is less than the size of two sticks of gum. This permits the device 102 to be easily inserted, interfaced, and activated with existing chip card readers. In an embodiment, the device 102 is manufactured within a new and enhanced chip card reader.

The device 102 looks for changes in heat (voltage and/or ground) that reflects noise and filters the noise based on a number of levels (stages). When a final stage is reached it is determined that a shimmer is present within the chip card reader and J2 is powered on and the interfaced device, sensor, or microcontroller is activated. Shimmers interfere within the voltage and ground of the chip card reader; thus, the device 102 provides a mechanism for shimmer security and theft prevention.

These and other embodiments are now discussed with reference to the FIGS. 2-4.

Figure 2:
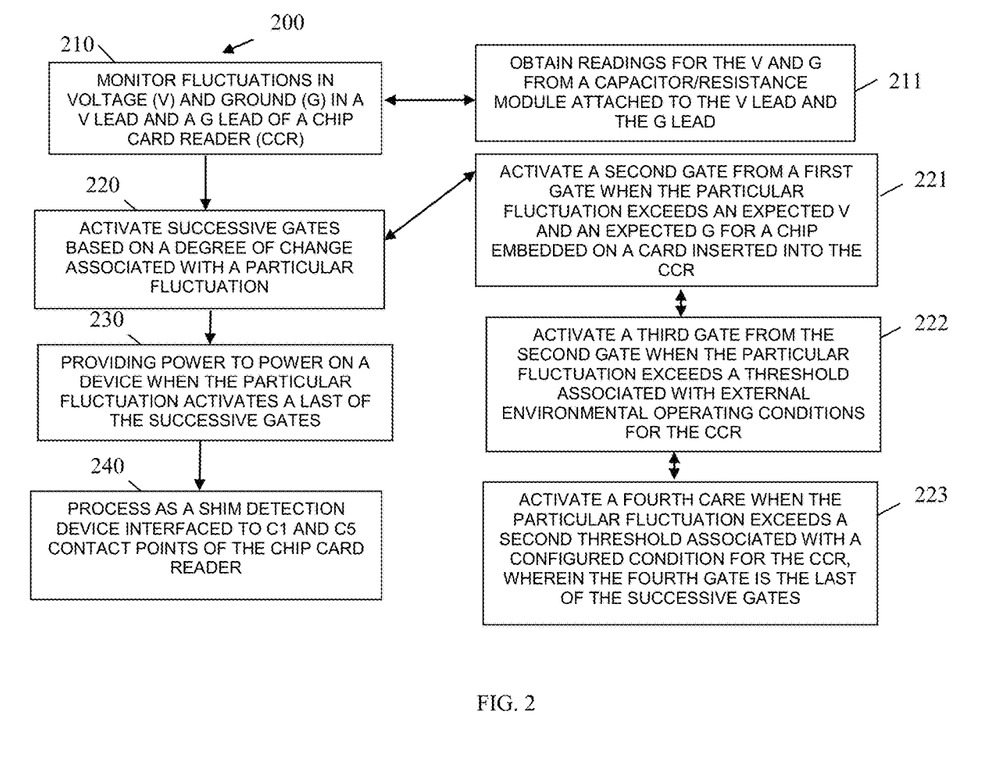
FIG. 2 is a diagram of a method for shimmer detection and prevention, according to an example embodiment.

FIG. 2 is a diagram of a method 200 for shimmer detection and prevention, according to an example embodiment. The hardware module(s) that implements the method 200 is referred to as a "shim detector." In an embodiment, the shim detector is implemented as specialized hardware circuitry to perform the processing discussed below for shim detection and prevention.

In an embodiment, the shim detector is the hardware device 102.

At 210, the shim detector monitors fluctuations in voltage and ground in a voltage lead and a ground lead of a chip card reader.

In an embodiment, at 211, the shim detector obtains readings for the voltage and the ground from a capacitor/resistance module attached to the voltage lead and the ground lead.

At 220, the shim detector activates successive gates based on a degree of change associated with a particular fluctuation.

According to an embodiment, at 221, the shim detector activates a second gate from a first gage when the particular fluctuation exceeds an expected voltage and an expected ground for a chip embedded on a card inserted into the chip card reader.

In an embodiment of 221 and at 222, the shim detector activates a third gate from the second gate when the particular fluctuation exceeds a threshold associated with external environmental operating conditions for the chip card reader.

In an embodiment of 222 and at 223, the shim detector activates a fourth gage from the third gage when the particular fluctuation exceeds a second threshold associated with a configured and known condition for the chip card reader. The fourth gage is the last of the successive gates.

At 230, the shim detector provides power to power on a device when the particular fluctuation activates a last of the successive gates.

According to an embodiment, the shim detector is processed as a shim detection device interfaced to C1 and C5 contact points on the chip card reader.

Figure 3:
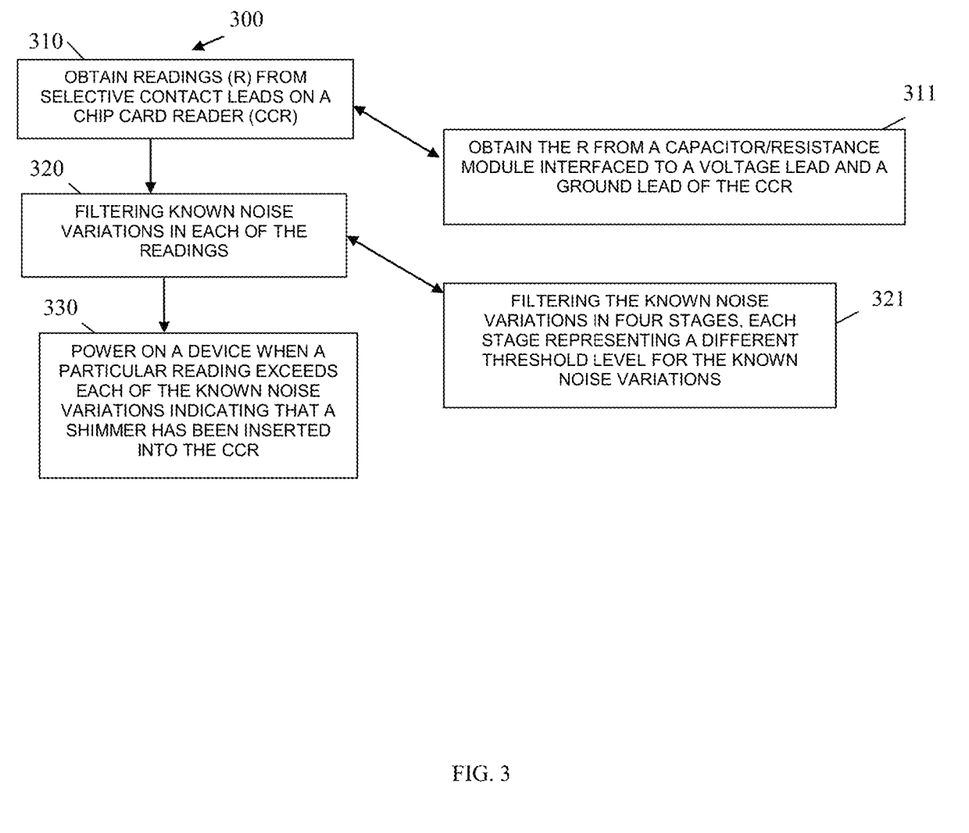
FIG. 3 is a diagram of another method for shimmer detection and prevention, according to an example embodiment.

FIG. 3 is a diagram of another method 300 for shimmer detection and prevention, according to an example embodiment. The hardware module(s) that implements the method 200 is referred to as a "shim security manager." In an embodiment, the shim security manager is implemented as specialized hardware circuitry to perform the processing discussed below for the shim detection and prevention.

The shim security manager presents another and in some ways enhanced processing perspective of the shim detector (discussed above with reference to the FIG. 2).

In an embodiment, the shim security manager is the shim detection unit 102.

In an embodiment, the shim security manager performs all or some combination of the processing discussed above with the FIGS. 1A-1C and 2.

At 310, the shim security manager obtains readings from selective contact leads on a chip card reader. The selective contact leads associated with contact points that the chip card reader makes with a chip embedded on a card when the card is inserted into the chip card reader for a transaction at a terminal that includes the chip card reader.

In an embodiment, at 311, the shim security manager obtain the readings from a capacitor/resistance module interfaced to a voltage lead and ground lead of the chip card reader.

At 320, the shim security manager filters known (configured) noise variations in each of the readings.

In an embodiment, at 321, the shim security manager filters the known noise variations in four stages. Each stage representing a different threshold level for the known noise variations.

At 330, the shim security manager powers on a device when a particular reading exceeds each of the known noise variations indicating that a shimmer has been inserted into the chip card reader.

Figure 4:
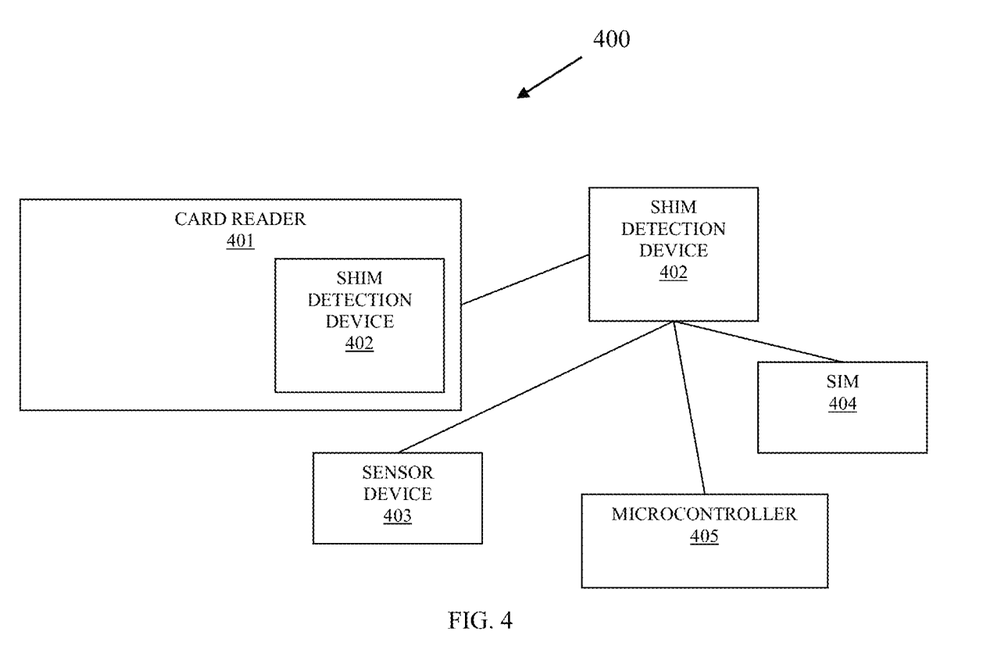
FIG. 4 is a diagram of shimmer detection and prevention device, according to an example embodiment.

FIG. 4 is a diagram of shim detection system 400, according to an example embodiment. The system 400 includes a plurality of devices with some devices having software modules that are executed by a processor from memory and the system 400 includes a device that provides processing through specialized hardware circuitry.

The system 400 includes a chip card reader 401 and a shim detection device 402.

The shim detection device 402 is interfaced to at least a portion of the chip card reader 401 and configured to detect when a shimmer is inserted into the chip card reader 401 during a card transaction at a terminal.

In an embodiment, the shim detection device 402 is integrated into the chip card reader and an integrated hardware component of the chip card reader 401.

In an embodiment, the shim detection device 402 is attached to a voltage and ground lead from C3 and C5 contact leads of the chip card reader 401.

In an embodiment, the shim detection device 402 is coupled to a capacitor/resistance module (component), the capacitor/resistance component is coupled to a voltage lead and a ground lead from C2 and C5 contact leads of the chip card reader 401.

In an embodiment, the shim detection device 402 is overlaid on the C2 and C5 contact leads of the chip card reader 401.

In an embodiment, the shim detection device 402 is configured to power on a device (403-405) in response to detecting variations in voltage or ground from the C2 and C5 contact leads of the chip card reader 401 indicating a shimmer has been inserted into the chip card reader 401.

In an embodiment, the device (403-405) is one of: a sensor device 403, a SIM 404, and a microcontroller 405.

In an embodiment, the SIM 404 is configured to send a SMS text when powered on by the shim detection device 402.

In an embodiment, the sensor device 403 is configured to one or more of: illuminate a LED and play a distinctive tone that emanates from the chip card reader 401.

In an embodiment, the microcontroller 405 is configured to power off the terminal that the chip card reader 401 is integrated into when the microcontroller 405 is powered on or receives a signal from the shim detection device 402.

In an embodiment, the chip card reader 401 is integrated into the terminal as a peripheral device of the terminal, and the terminal is one of: a SST, a POS terminal, and an ATM.

One now appreciates how a lower cost and adaptable shim detection device can be interfaced to existing chip card readers with little effort and shimmers can be detected in real time and preventive actions take to prevent theft of a consumer's card information by the shimmer.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system, comprising:
a chip card reader; and
a shim detection device interfaced to at least a portion of the chip card reader and configured to detect when a shimmer is inserted in the chip card reader during a card transaction at a terminal;
wherein the shim detection device is adapted and configured to:
be inserted into the chip card reader and between the chip card reader and any potential shimmer device that may be inserted into the chip card reader;
include no software executing on the shim detection device;
include a component that is configured to be fully powered on by a battery of the shim detection device when deviations in voltage pass through a series of successive filtering gates from the battery and reach the component, and wherein the component when fully powered on is adapted to generate a power on alert that is detected by a microcontroller of a terminal having the chip card reader, the power on alert providing an indication to the terminal that a shimmer was inserted into the chip card reader.

2. The system of claim 1, wherein the chip card reader is attached to a voltage and ground lead from C2 and C5 contact leads of the chip card reader.

3. The system of claim 1, wherein shim detection device is coupled to a capacitor/resistance component, and the capacitor/resistance component is coupled to a voltage and ground lead from C2 and C5 contact leads of the chip card reader.

4. The system of claim 1, wherein the shim detection device is overlaid on the C2 and C5 contact leads of the chip card reader.

5. The system of claim 1, wherein shim detection device is configured to supply power from the component to a device in response to detecting variations in voltage or ground from the C2 and C5 contact leads of the chip card reader indicating the shimmer has been inserted into the chip card reader.

6. The system of claim 5, wherein the device is one of: a sensor device, a Subscriber Identity Module (SIM), and the microcontroller.

7. The system of claim 6, wherein the SIM is configured to send a Short Message Service (SMS) text when powered on by the shim detection device.

8. The system of claim 6, wherein the sensor device is configured to one or more of: illuminate a Light Emitting Diode and play a distinctive audio tone.

9. The system of claim 6, wherein the microcontroller is configured to power off the terminal that the chip card reader is integrated into.

10. The system of claim 1, wherein the chip card reader is integrated the terminal, and the terminal is one of: a Self-Service Terminal (SST), a Point-Of-Sale (POS) terminal, and an Automated Teller Machine (ATM).

11. A method, comprising:
monitoring, by a shim detection device, fluctuations in voltage and ground from a power lead and a ground lead of a chip card reader, wherein the ship detection device is a hardware device and does not execute any software;

activating, by the shim detection device, successive gates based on a degree of change associated with a particular fluctuation; and providing, by the shim detection device power to power on a device when the particular fluctuation activates a last of the series of gates by supplying power from a battery of the shim detection device to a component of the shim detection device and the device interfaced to the component for power.

12. The method of claim 11, wherein monitoring further includes obtaining readings for the voltage and ground from a capacitor/resistance module attached to the power lead and the ground lead.

13. The method of claim 11, wherein activating further includes activating a second gate from a first gate when the particular fluctuation exceeds an expected voltage and an expected ground for a chip embedded on a card inserted into the chip card reader.

14. The method of claim 13, wherein activating further includes activating a third gate from the second gate when the particular fluctuation exceeds a threshold associated with external environmental operating conditions for the chip card reader.

15. The method of claim 14, wherein activating further includes activating a fourth gate from the third gate when the particular fluctuation exceeds a second threshold associated with a configured condition for the chip card reader, wherein the fourth gate is the last of the successive gates.

16. The method of claim 11 further comprising, interfacing the shim detection device to C1 and C5 contact points of the chip card reader.

17. A method, comprising:

obtaining, by a shim detection device, readings from selective contact leads on a chip card reader, wherein the shim detection device inserted into the chip card reader and is a hardware device that does not execute any software;

filtering, by gates of the shim detection device, known and preconfigured noise variations in each of the readings; and powering on a device by a component of the shim detection device when the component receives power from a battery of the shim detection device after passing through all of the gates and the component supplying power to the device as an indication that a shimmer was inserted into the card reader casing a particular reading to exceed each of the known and preconfigured.

18. The method of claim 17, wherein obtaining further includes obtaining the readings from a capacitor/resistance module interfaced to a voltage lead and a ground lead of the chip card reader.

19. The method of claim 17, wherein filtering further includes filtering the known noise variations in four stages, each stage representing a different threshold level for the known noise variations.

* * * * *